United States Patent
Chavez et al.

(10) Patent No.: US 10,549,854 B2
(45) Date of Patent: Feb. 4, 2020

(54) INTEGRATED AIRCRAFT HOIST

(71) Applicant: Bell Helicopter Textron Inc., Fort Worth, TX (US)

(72) Inventors: Jeremy Robert Chavez, Colleyville, TX (US); Steven W. Kihara, North Richland Hills, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 667 days.

(21) Appl. No.: 15/082,839

(22) Filed: Mar. 28, 2016

(65) Prior Publication Data

US 2016/0340038 A1    Nov. 24, 2016

Related U.S. Application Data

(60) Provisional application No. 62/138,800, filed on Mar. 26, 2015.

(51) Int. Cl.
*B64D 1/22* (2006.01)
*B64C 29/00* (2006.01)
*B64D 47/08* (2006.01)

(52) U.S. Cl.
CPC ............ *B64D 1/22* (2013.01); *B64C 29/0033* (2013.01); *B64D 47/08* (2013.01)

(58) Field of Classification Search
CPC ... B64D 1/00; B64D 1/02; B64D 1/04; B64D 1/06; B64D 1/08; B64D 1/10; B64D 1/12; B64D 1/22; B64D 7/00; B64D 7/08
See application file for complete search history.

(56) References Cited

U.S. PATENT DOCUMENTS

| | | | | | |
|---|---|---|---|---|---|
| 2,469,363 | A | * | 5/1949 | Biondi | B64D 1/04 89/1.51 |
| 2,502,416 | A | * | 4/1950 | Brown | B64D 1/06 244/137.4 |
| 2,520,317 | A | * | 8/1950 | Laddon | B64D 1/06 244/129.1 |
| 2,591,834 | A | * | 4/1952 | Kuka | B64D 1/04 89/1.819 |
| 2,734,705 | A | * | 2/1956 | Robertson | B64D 1/04 244/137.4 |
| 3,712,567 | A | * | 1/1973 | Ruggeri | B64D 1/04 244/137.4 |
| 4,802,641 | A | * | 2/1989 | Hardy | B64D 1/04 244/137.4 |
| 5,915,290 | A | * | 6/1999 | Coleman | B64F 1/32 89/1.51 |
| 6,542,181 | B1 | * | 4/2003 | Houska | B64D 47/08 348/144 |
| 6,705,571 | B2 | * | 3/2004 | Shay | B64D 1/08 244/137.1 |
| 8,292,229 | B2 | * | 10/2012 | Pancotti | B64C 1/1415 244/129.5 |
| 8,590,841 | B1 | * | 11/2013 | Hall | B64C 1/22 244/137.1 |

(Continued)

*Primary Examiner* — Richard R. Green
*Assistant Examiner* — Michael B. Kreiner
(74) *Attorney, Agent, or Firm* — Lightfoot & Alford PLLC (57) ABSTRACT

An aircraft has a wing and at least a portion of a hoist system disposed within the wing. A method of hoisting an item includes disposing at least a portion of a hoist system within a wing of an aircraft and extending a cable of the hoist system through an access hole of an exterior wall of the wing.

17 Claims, 13 Drawing Sheets

(56) References Cited

U.S. PATENT DOCUMENTS

| | | | |
|---|---|---|---|
| 8,591,161 B1* | 11/2013 | Bernhardt | B63B 27/10 |
| | | | 414/137.6 |
| 9,174,731 B2* | 11/2015 | Ross | B64C 29/0033 |
| 2017/0291707 A1* | 10/2017 | Veronesi | B64D 1/22 |
| 2017/0341748 A1* | 11/2017 | Barbieri | B64C 1/0009 |

* cited by examiner

INTEGRATED AIRCRAFT HOIST

CROSS-REFERENCE TO RELATED APPLICATIONS

This patent application claims the benefit of the filing date of the U.S. Provisional Patent Application Ser. No. 62/138,800, filed on 26 Mar. 2015 and entitled "Integrated Aircraft Hoist," the entire content of which is hereby expressly incorporated by reference.

BACKGROUND

Some aircraft are equipped with hoists configured to raise, lower, and or suspend equipment and/or people relative to the aircraft. Some aircraft hoists are installed to aircraft using large and heavy additional equipment, such as, but not limited to, booms and vertical supports that occupy space within a cabin of the aircraft and/or extend from the aircraft into an airstream during aircraft flight even when the hoist is not in use. Further, some hoists are configured to raise equipment, people, animals, and/or other objects to a vertical location near but below a deck of a cabin of the aircraft, thereby requiring an aircraft crew member to grab, lift, and draw the hoisted items into the cabin manually and working against gravity and aerodynamic forces.

DETAILED DESCRIPTION

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
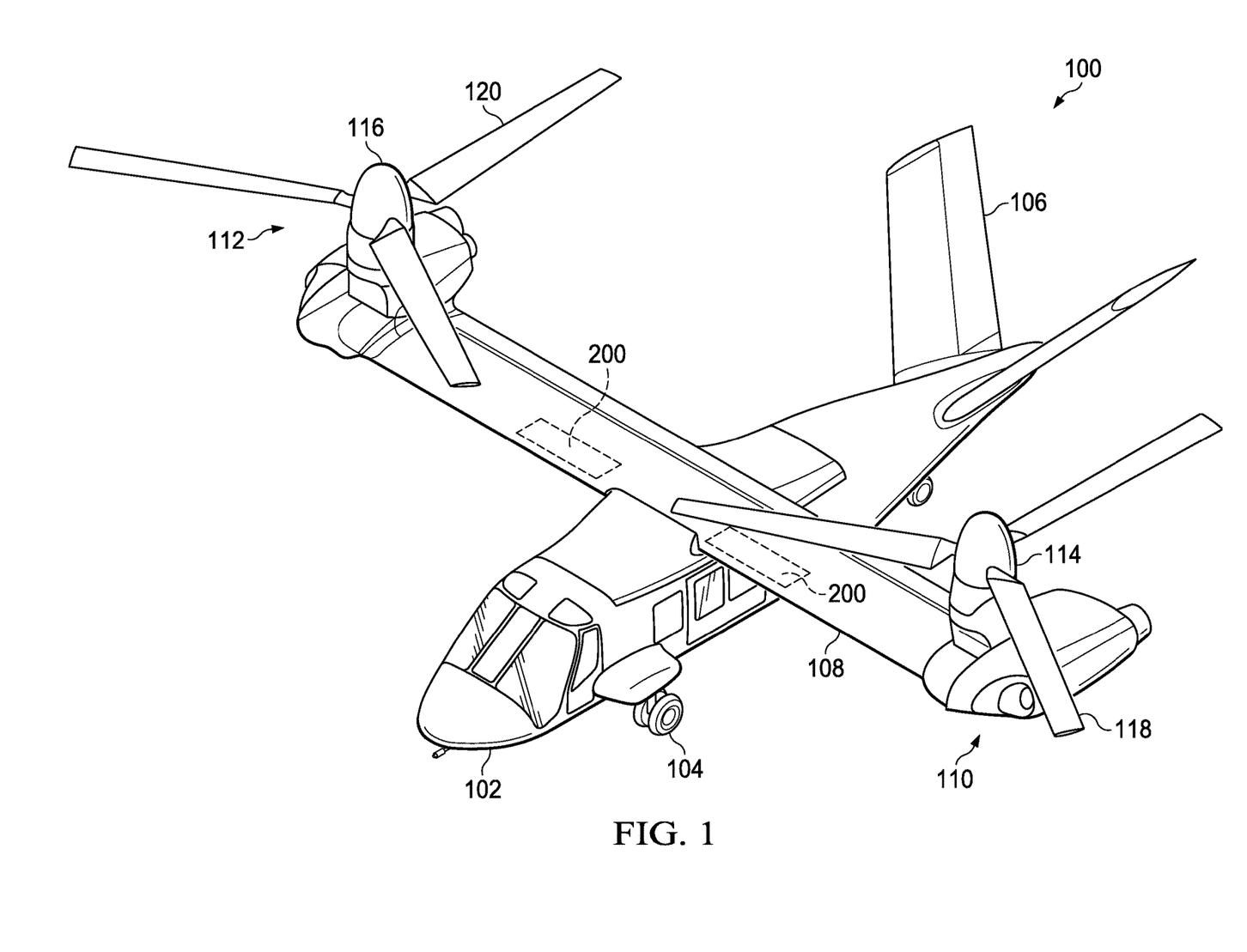
FIG. 1 is an oblique view of an aircraft according to an embodiment of this disclosure showing the aircraft in a helicopter mode of operation, the aircraft comprising two Integrated Hoist Systems (IHSs).

Referring to FIG. 1 in the drawings, a tiltrotor aircraft 100 is illustrated. Tiltrotor aircraft 100 can include a fuselage 102, a landing gear 104, a tail member 106, a wing 108, a propulsion system 110, and a propulsion system 112. Each propulsion system 110 and 112 includes a fixed engine and a rotatable proprotor 114 and 116, respectively. Each rotatable proprotor 114 and 116 have a plurality of rotor blades 118 and 120, respectively, associated therewith. The position of proprotors 114 and 116, as well as the pitch of rotor blades 118 and 120, can be selectively controlled in order to selectively control direction, thrust, and lift of tiltrotor aircraft 100.

Figure 2:
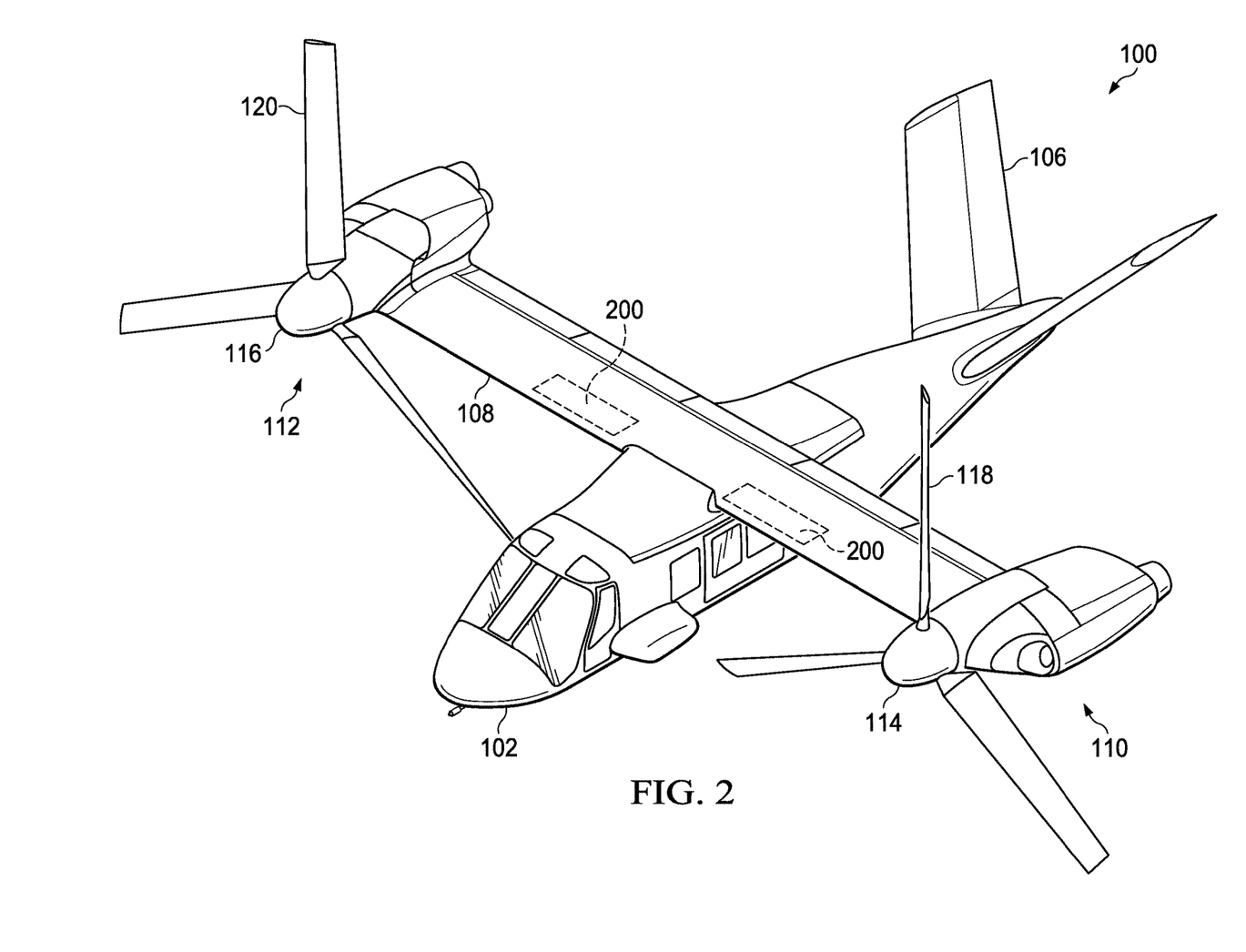
FIG. 2 is an oblique view of the aircraft of FIG. 1 showing the aircraft in an airplane mode of operation.

FIG. 1 illustrates tiltrotor aircraft 100 in helicopter mode, in which proprotors 114 and 116 are positioned substantially vertical to provide a lifting thrust. FIG. 2 illustrates tiltrotor aircraft 100 in an airplane mode, in which proprotors 114 and 116 are positioned substantially horizontal to provide a forward thrust in which a lifting force is supplied by wing 108. It should be appreciated that tiltrotor aircraft 100 can be operated such that proprotors 114 and 116 are selectively positioned between airplane mode and helicopter mode, which can be referred to as a conversion mode.

The propulsion system 112 is substantially symmetric to the propulsion system 110; therefore, for sake of efficiency certain features will be disclosed only with regard to propulsion system 110. However, one of ordinary skill in the art would fully appreciate an understanding of propulsion system 112 based upon the disclosure herein of propulsion system 110.

Further, propulsion systems 110 and 112 are illustrated in the context of tiltrotor aircraft 100; however, propulsion systems 110 and 112 can be implemented on other tiltrotor aircraft. For example, an alternative embodiment may include a quad tiltrotor that has an additional wing member aft of wing 108, the additional wing member can have additional propulsion systems similar to propulsion systems 110 and 112. In another embodiment, propulsion systems 110 and 112 can be used with an unmanned version of tiltrotor aircraft 100. Further, propulsion systems 110 and 112 can be integrated into a variety of tiltrotor aircraft configurations.

In this embodiment, the tiltrotor aircraft 100 further comprises a cabin 122 having laterally located cabin openings 124 configured to allow loading and unloading of passengers, equipment, and other objects. The cabin 122 generally comprises a deck 125 which can serve as a floor or subfloor of the cabin 122. Further, the wing 108 extends laterally across the tiltrotor aircraft 100 and above the cabin 122 and cabin openings 124. In this embodiment, the tiltrotor aircraft 100 further comprises two Integrated Hoist Systems (IHSs) 200. Most generally, at least a portion of each IHS 200 is disposed in a portion of a wing 108. In some embodiments, the two IHSs 200 are completely independent of each other to provide full redundancy and to maintain a hoisting capability in the case that one of the IHSs 200 fail or is uninstalled.

Figure 3:
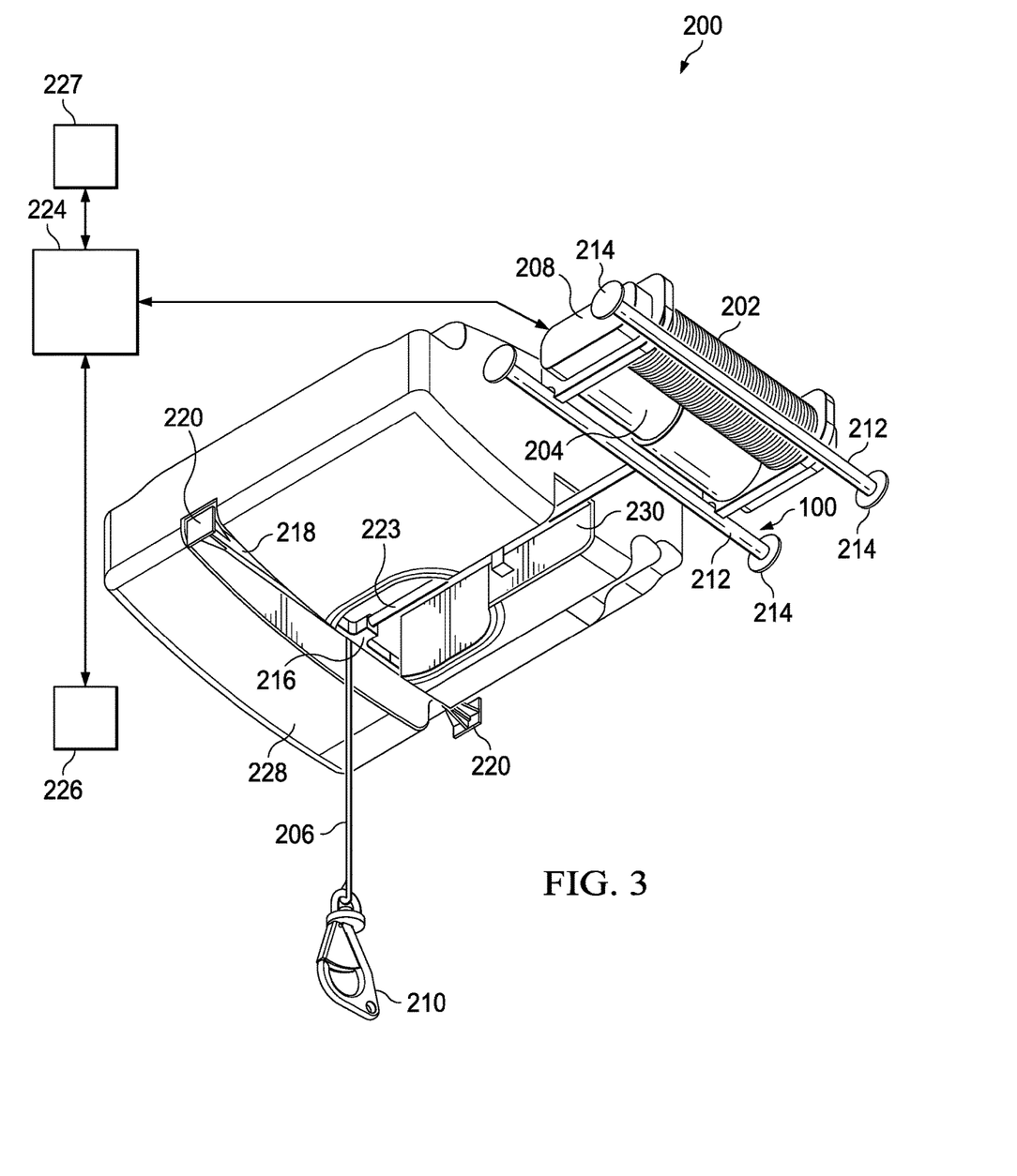
FIG. 3 is an oblique bottom view of an IHS shown in isolation.
Figure 4:
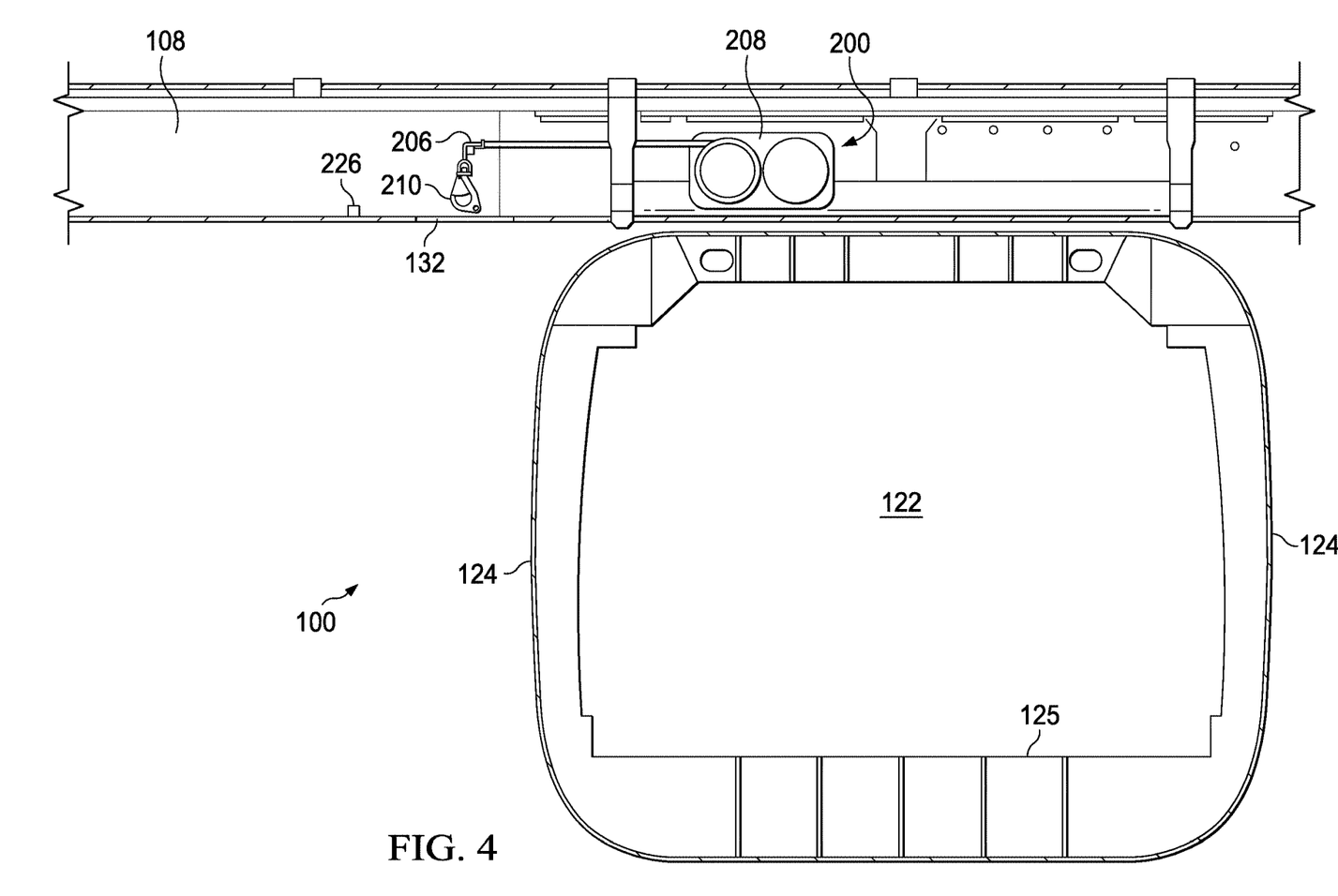
FIG. 4 is an orthogonal partial front view of the aircraft of FIG. 1 showing a schematic representation of an IHS according to an embodiment of this disclosure.
Figure 5:
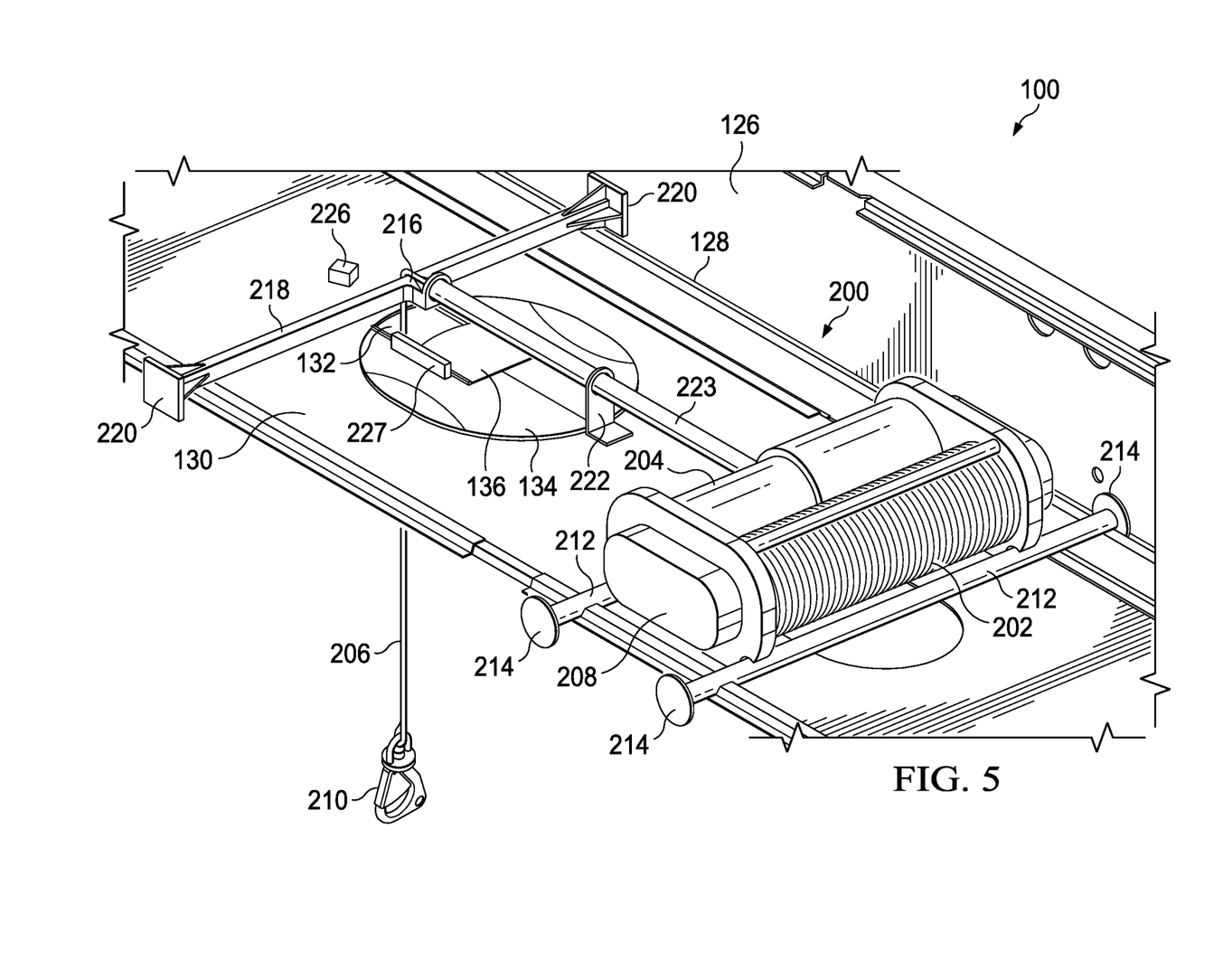
FIG. 5 is an oblique partial top view of the aircraft of FIG. 1 showing an IHS installed relative to a spar of a wing.
Figure 6:
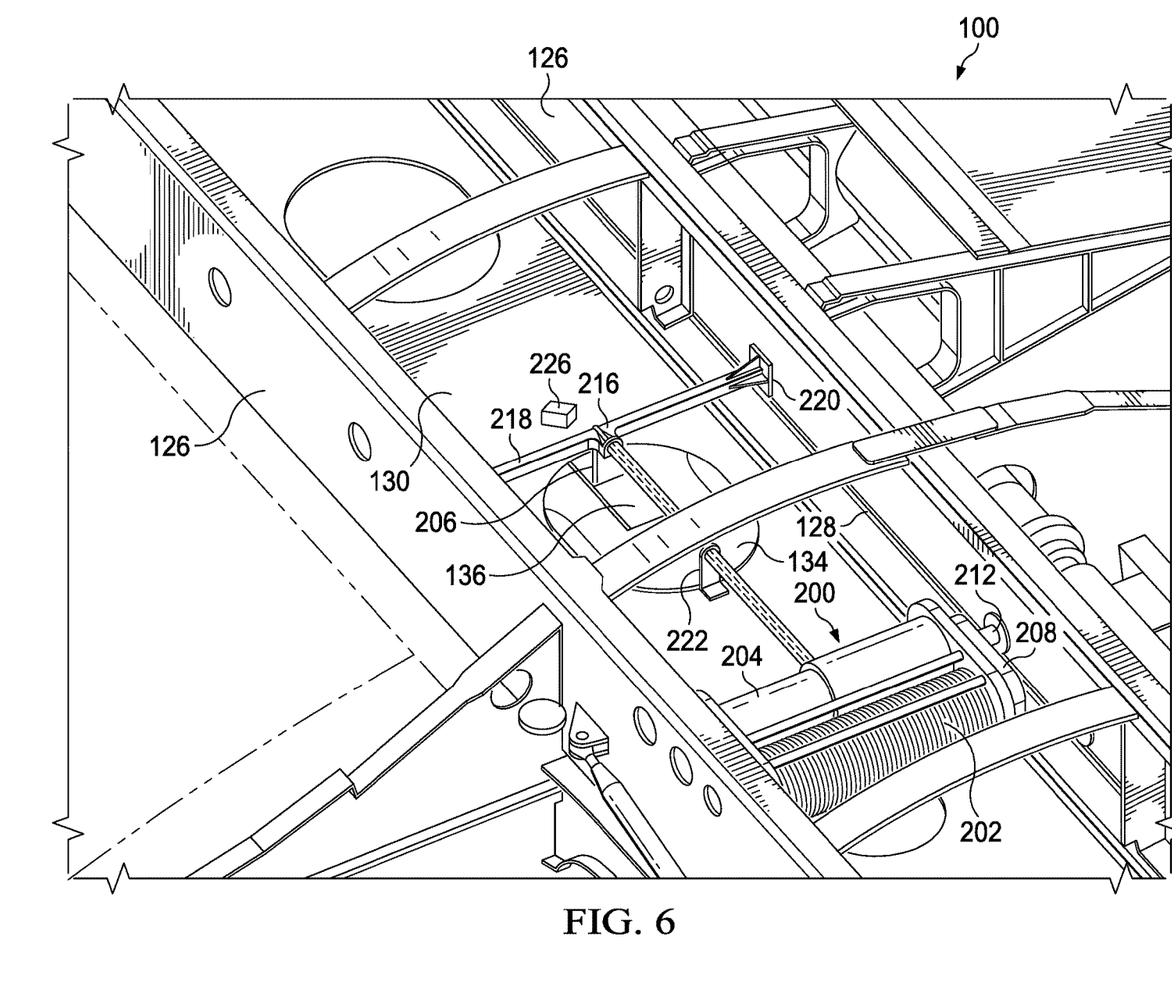
FIG. 6 is an oblique partial top view of the aircraft of FIG. 1 showing an IHS installed between two spars of a wing.

FIG. 3 shows an IHS 200 in isolation while FIGS. 4-10 show IHS(s) 200 installed in a tiltrotor aircraft 100. The IHS 200 generally comprises an electric motor 202, a rotatable spool 204, and a cable 206. The motor 202 and spool 204 are carried by a carriage 208 comprising internal gearing and/or other mechanical linkages to transfer movement of the motor 202 into rotation of the spool 204. The cable 206 can comprise any suitable hoisting cable, such as, but not limited to, a lubricated metal cable. In some embodiments, the cable 206 comprises an end that is terminated with a hook 210 for use in connection to other devices that may be utilized in hoisting or otherwise tethering the IHS 200 to an object. In some cases, the hook 210 may be configured for connection to so-called jungle penetrators which are sometimes utilized in operations for hoisting people. In other cases, the hook 210 may be configured for connection to rescue baskets, vehicles, water delivery devices, and/or any other suitable items that a hoist may be used to apply a lifting force.

In this embodiment, the carriage 208 is configured for attachment to two carriage supports 212. The carriage supports 212 can comprise metal rods and/or bars and the carriage supports 212 are configured for being attached to and/or supported by spars 126 of wings 108. In this embodiment, the ends of the carriage supports 212 are configured as disc-like endcaps 214 that are configured to be received into rails 128 of the spars 126. The IHS 200 further comprises a pulley 216 configured to receive the cable 206 and allow rotation of the pulley 216 to provide a change in direction of the cable 206. The pulley 216 is generally supported by a crossbar 218 that also extends between and is supported by spars 126. In this embodiment, the crossbar 218 comprises rectangular shaped platelike feet 220 that are configured to be received into rails 128 of the spars 126. In some embodiments, the IHS 200 further comprises a cable support 222 that comprises an aperture through which the cable 206 is passed and the cable support 222 is configured for attachment to a wall 130 or skin of the wing 108. The cable support 222 is configured to maintain a standoff distance between the cable 206 and the wall 130. In some embodiments, a tubular shroud 223 is provided that extends between the crossbar 218 and the cable support 222 and further extends from the cable support 222 toward the spool 204. While the shroud shown generally comprises a tubular member, in alternative embodiments, the shroud may take any other suitable shape, such as a triangular box-shape with a larger opening toward the spool 204 and positioned to behave like a funnel aimed toward the pulley 216. The shrouds can optionally prevent damage in cases where a cable 206 snaps, frays, or otherwise become non-uniform or is misfed to or from the spool 204. Further, the wall 130 comprises an access hole 132 through which the cable 206 and/or hook 210 can extend and through which the cable 206 and/or hook 210 may be passed through for selective stowing within the wing 108. The access hole 132 may be provided a cover 134 comprising a movable door 136.

Still further, the IHS 200 can comprise a controller 224 configured to control, monitor, and/or power the motor 202. In some embodiments, the controller 224 can be configured to communicate with other aircraft control systems. In the embodiment shown, the IHS 200 further comprises a camera 226 such as, but not limited to, a visible light video camera, infrared camera, heat sensitive camera, and/or other type of camera well-suited for monitoring hoisting operations. In some embodiments, the camera 226 can be configured for control by the controller 224 so that operation of the motor 202 serves as a trigger or initiation of operation of the camera 226. In some embodiments, the controller 224 is configured to receive manual inputs from a relatively local handheld pushbutton control whereas in other embodiments the controller 224 can be configured to receive control signals from remote locations such as from a pilot and/or from a person, machine, or computer not located on the tiltrotor aircraft 100. In some embodiments, the controller 224 may further be configured to control an actuator 227 associated with the movable door 136 and/or the cover 134 so that the movement of the door can be at least partially automated, such as, but not limited to, pressing a remotely located button to cause the movable door 136 or cover 134 to open and release and/or allow access to the hook 210 and/or cable 206.

Figure 7:
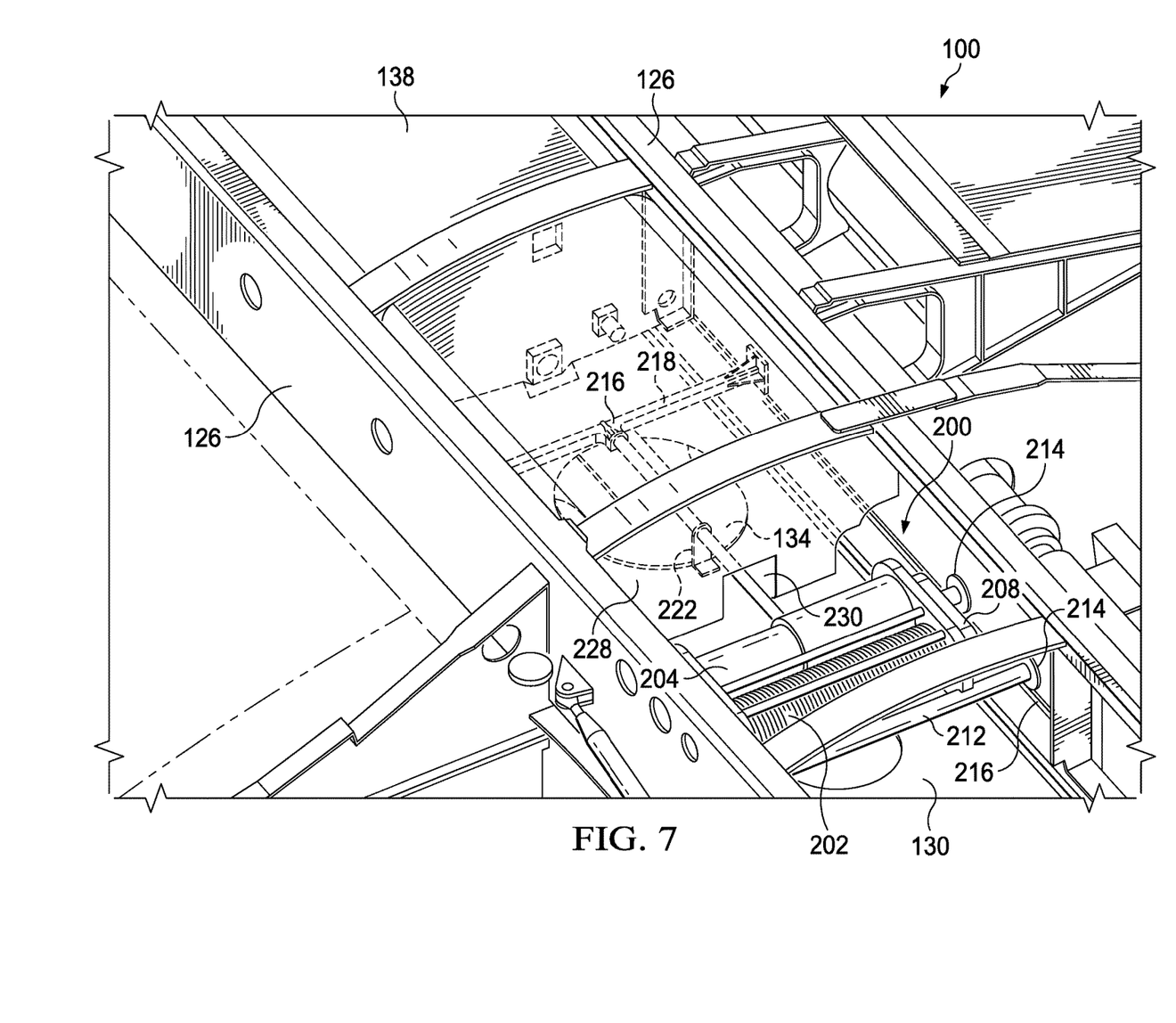
FIG. 7 is an oblique partial top view of the aircraft of FIG. 1 showing an IHS installed between two spars of a wing and with fuel bags installed.
Figure 8:
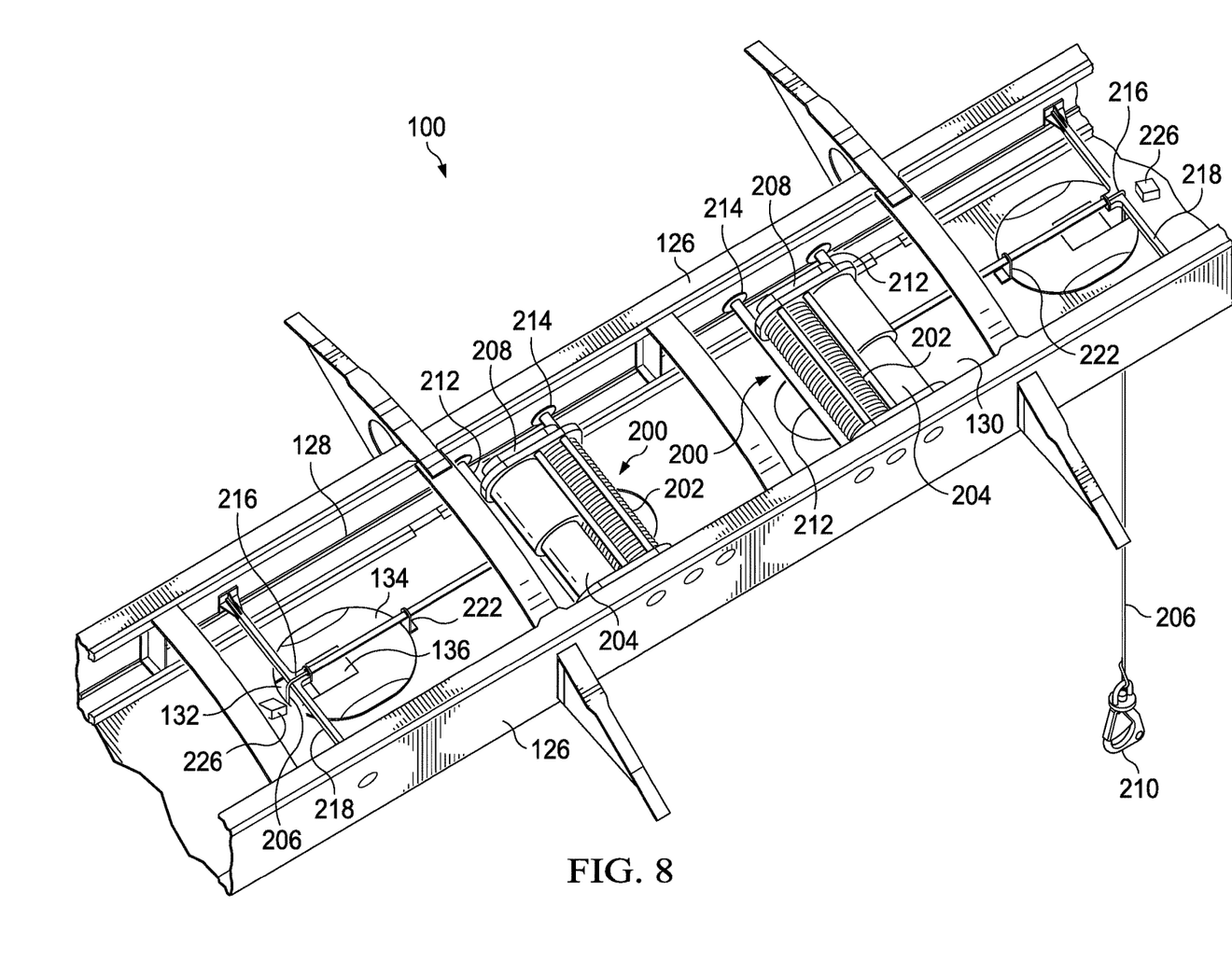
FIG. 8 is an oblique partial top view of the aircraft of FIG. 1 showing two IHSs installed between two spars of a wing.
Figure 9:
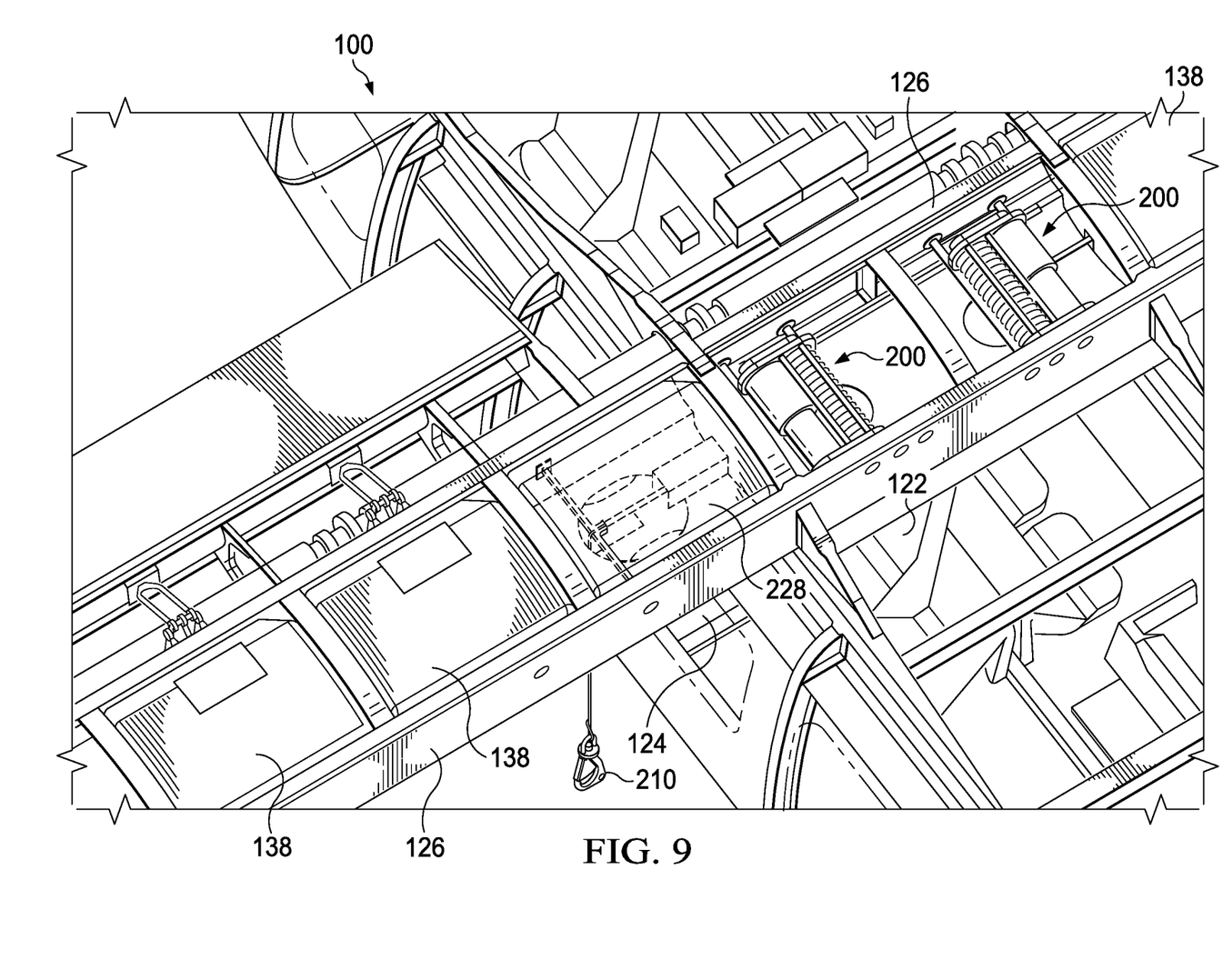
FIG. 9 is an oblique partial top view of the aircraft of FIG. 1 showing two IHSs installed between two spars of a wing and with fuel bags installed.

Referring now to FIGS. 3, 7, and 9, embodiments are shown that illustrate the IHS 200 comprising a notched fuel bag 228. The notched fuel bag 228 generally comprises recesses 230 formed therein to accommodate passage of the cable 206, pulley 216, crossbar 218, cable support 222, and/or hook 210. In this manner, location of the IHS 200 in the wing 108 between spars 126 can have a reduced impact on a reduction of interior space of wing 108 available for carrying fuel in standard fuel bags 138.

Figure 10:
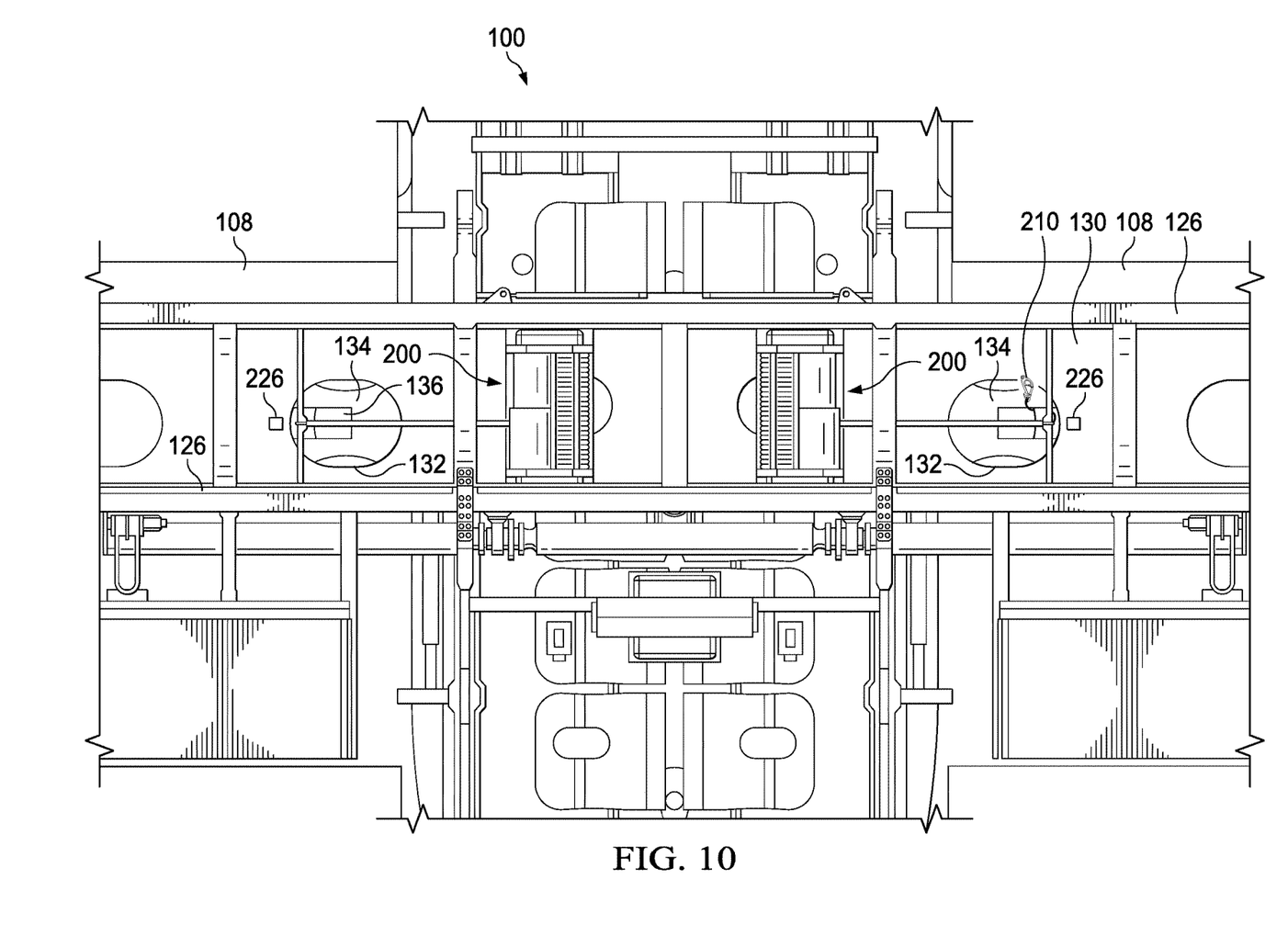
FIG. 10 is an orthogonal partial top view of the aircraft of FIG. 1 showing two IHSs installed between two spars of a wing.

Referring now to FIGS. 9 and 10, embodiments are shown where the IHSs 200 are disposed at least partially vertically above the cabin 122 and at least partially vertically above an areas laterally exterior to the cabin openings 124 under the wings 108. More specifically, in this embodiment the carriage 208, motor 202, and spool 204 are located above the cabin 122 and between spars 126. Further, the pulley 216 and crossbar 218 are located within the wing 108, between spars 126, and vertically higher than the cabin 122 but laterally beyond the cabin opening 124. The above-described locations allow the IHSs 200 to be carried on the tiltrotor aircraft 100 in spaces other than those normally associated with occupancy or typical cargo. Further, the above-described location of the pulley 216 and crossbar 218 allow for a relatively higher hoisting location as compared to conventional hoist systems so that hoisted items can be raised toward the wing 108 and in many cases vertically clear the deck 125 so that the hoisted items can be laterally moved into the cabin 122 with less or without the need to manually lift the hoisted items against gravity an upward onto the deck 125. Still further, with pulley 216, crossbar 218, and extended portions of the cable 206 being stowable within the wing 108, the IHSs 200 provide optional zero impact on aerodynamic drag properties of the tiltrotor aircraft 100. Still further, with the above-described location of the hook 210 and cable 206 being below the wing 108, the cable 206, hook 210, and any hoisted items are shielded from downwash of the rotor blades 118, 120. In some embodiments, the motor 202 and spool 204 can be located within a wing torque box of the wing 108.

In operation, the tiltrotor aircraft 100 can first be operated in helicopter mode as shown in FIG. 1 to take off from the ground. During takeoff, all of the components of the IHSs 200 can be stowed away in the wings 108 between spars 126 as described above. Next, the tiltrotor aircraft 100 can transition to airplane mode as shown in FIG. 2 and travel toward an intended location at speeds higher than available when operating in helicopter mode. Once the tiltrotor aircraft 100 has neared the desired location, the tiltrotor aircraft 100 can transition back to helicopter mode. In cases where an IHS 200 is needed, the tiltrotor aircraft 100 can generally hover while deploying the hook 210. Hook 210 deployment can comprise utilizing the controller 224 to first cause actuation of the actuator 227. Such actuation can be configured to eject or otherwise deploy the hook 210, but in cases where the actuation is limited to opening the movable door 136, a crew member can reach into the wing 108 and manually retract the hook 210. Next the crew member, a pilot, and/or a computer can cause the controller 224 to begin unspooling the cable 206.

Figure 11:
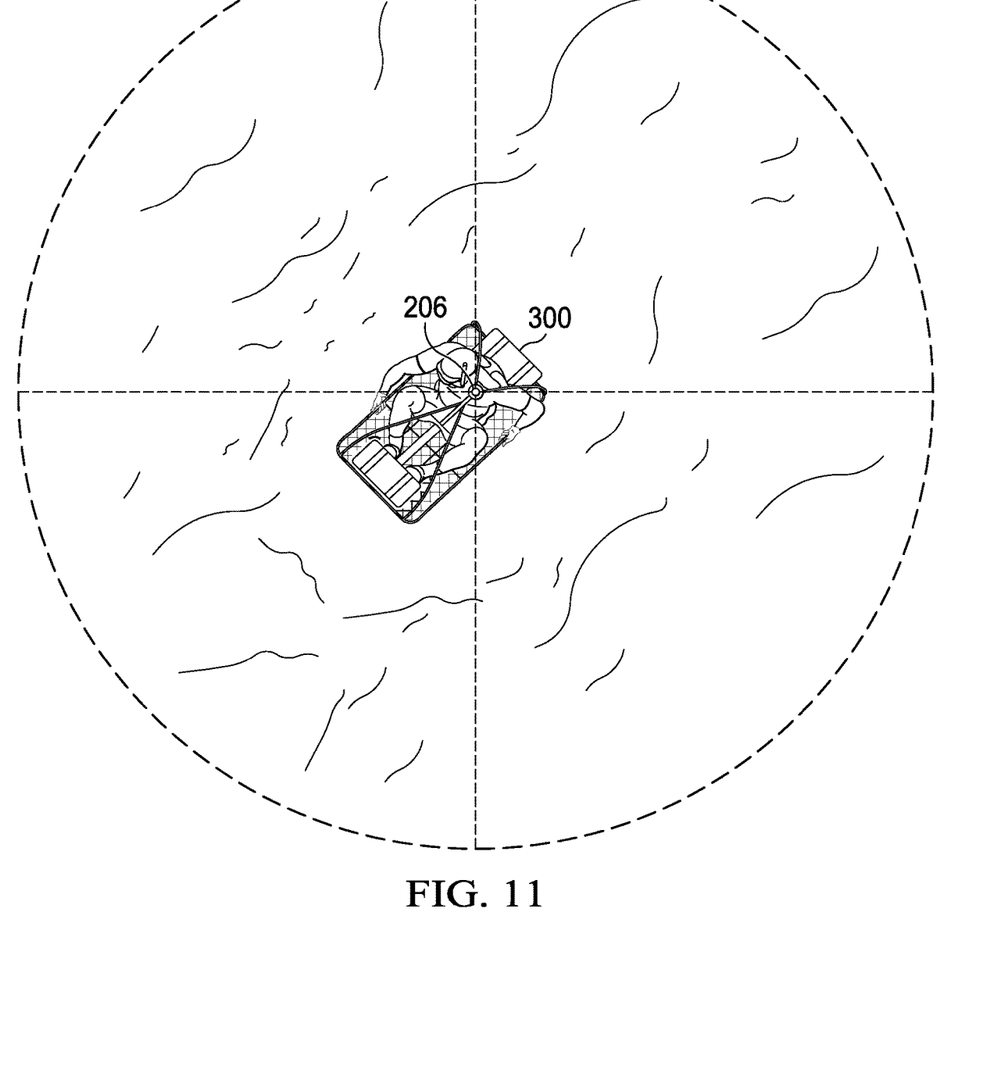
FIG. 11 is a simulated sample image from a camera showing a hoisted item relatively far from a wing and centered under the pulley of an IHS.
Figure 12:
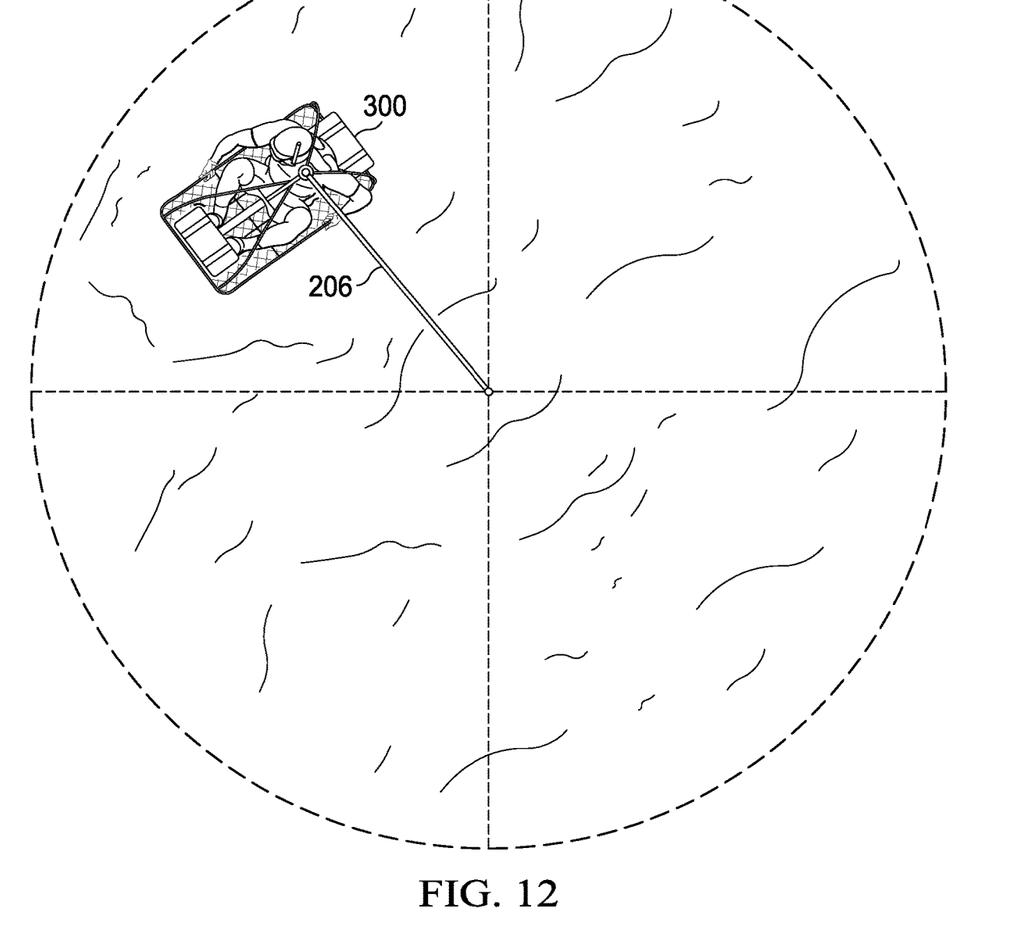
FIG. 12 is a simulated sample image from a camera showing a hoisted item relatively far from a wing and not centered under the pulley of an IHS.
Figure 13:
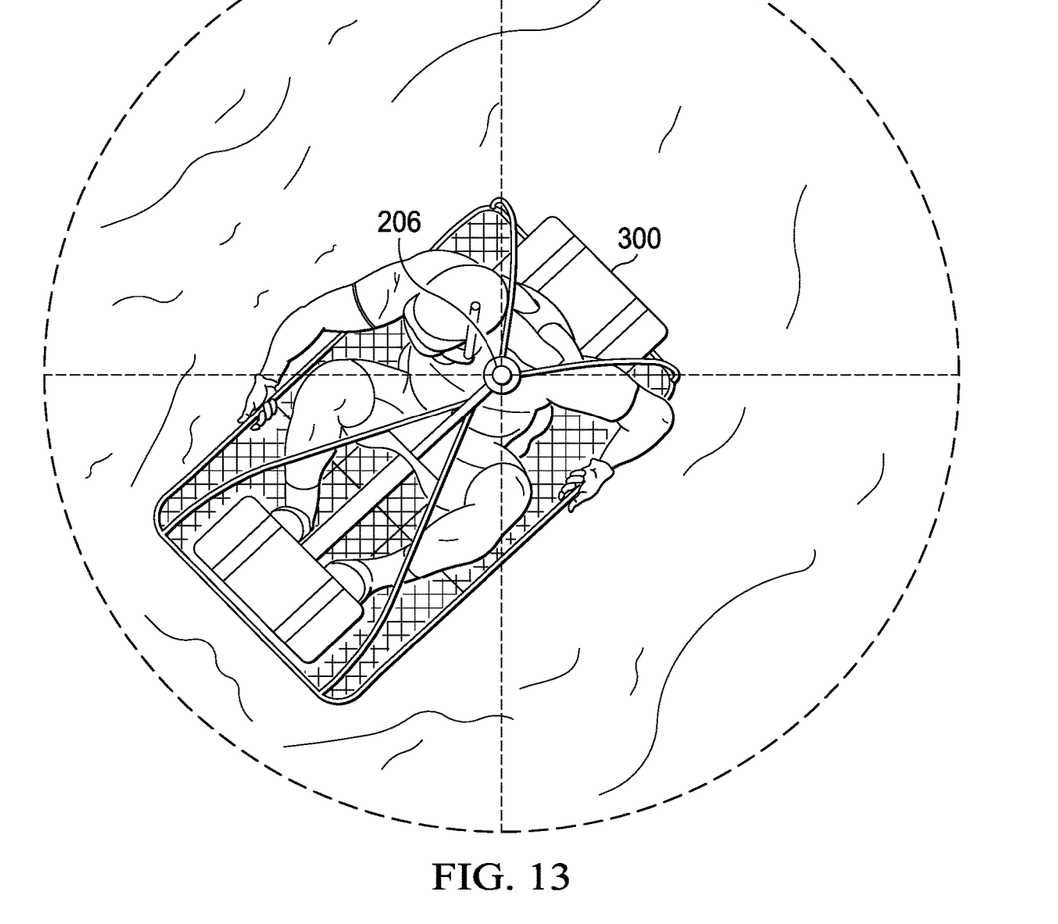
FIG. 13 is a simulated sample image from a camera showing a hoisted item relatively near a wing and centered under the pulley of an IHS.

The unspooling can be monitored through the use of the camera 226 and a related display located near the IHS 200 or remote from the IHS 200. More specifically, the camera 226 can be configured to feed video to a pilot. Once the hook 210 has reached a target item for hoisting (Stokes litter, jungle penetrator, horse collar, etc.), the hook 210 can be attached to the item intended to be hoisted. At the beginning of hoisting an item 300, the pilot, crew member, and/or a computer can be provided a view of the hoisting operation substantially similar to that shown in FIG. 11. When an image or video such as that shown in FIG. 11 is provided to a pilot, the pilot can know that the hoisted item is located relatively centered and directly beneath the IHS 200 so that no major corrective action needs to be taken to ensure straight lifting of the hoisted item. However, when an image or video such as that shown in FIG. 12 is provided to a pilot, the pilot can know that the hoisted item is not centered and located directly below the IHS 200 and the pilot can maneuver the tiltrotor aircraft 100 to correct the misalignment. Further, while FIGS. 11 and 12 are helpful in signifying that a hoisted item is relatively far away from the wing 108, the image of FIG. 13 is further useful to a pilot or other crew member insofar as it indicates that, as a function of the hoisted item occupying a relatively larger portion of the field of view of the camera 226, the hoisted item is closer to the wing 108. This knowledge provided to the pilot or other crew members can be helpful in anticipating when the pilot can begin leaving a location when fast departure is beneficial. Still further, the pilot, crew members, computers, and/or remotely located viewers can monitor the hoisting operation so that near real-time information regarding a hoisting mission can be communicated without added communication burdens on the pilot and/or crew members.

In alternative embodiments, carriage supports 212 and/or the crossbars utilized to support the motor 202, spool 204, and/or pulley 216 may comprise structural elements shaped different from that described above. In some cases, the rods and/or bars of the above-described carriage supports 212 and/or crossbars may, in some embodiments, be replaced, supplanted, and/or integrated with more highly engineered structures, such as, but not limited to, I-beams and/or other rigid forms. Further, in some embodiments, the carriage supports 212 and/or crossbars may be attached to the spars 126 differently than described above. For example, in some embodiments, the carriage supports 212 and/or crossbars may be bolted, welded, and/or otherwise fixed to the spars 126 utilizing mechanical attachments devices and/or methods in addition to or instead of utilizing a rail of the spars 126.

While the above embodiments have been described relative to a tiltrotor aircraft 100, the IHSs 200 of this disclosure can be installed in the wing or similar structure of any other suitable aircraft. In some embodiments, the IHSs 200 are configured to allow for a 30 degree draft angle of the cable during hoist operations. In some embodiments, the electric motor 202 and cable spool 204 are accessible from within the cabin 122 via access panels to allow for routine maintenance. In some embodiments, aircraft scoops and/or ducts can be routed to provide cooling for the electric motor 202.

In some embodiments, an IHS 200 can be mounted within an empennage structure above an aft ramp to provide substantially similar benefits as mounting an IHS 200 within a wing 108.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. An aircraft, comprising:
a wing; and
at least a portion of a hoist system disposed within the wing, wherein the hoist system comprises a spool;
wherein the spool of the hoist system is located above a cabin of the aircraft.

2. The aircraft of claim 1, wherein the wing is vertically above a cabin opening of the aircraft.

3. The aircraft of claim 1, wherein a cable of the hoist system is located within the wing and extends substantially laterally along a length of the wing.

4. The aircraft of claim 3, wherein the cable is configured to selectively extend through an access hole of an exterior wall of the wing.

5. The aircraft of claim 1, wherein a pulley of the hoist system is located laterally beyond a cabin opening of the aircraft.

6. The aircraft of claim 1, wherein a motor of the hoist system is located above a cabin of the aircraft.

7. The aircraft of claim 1, further comprising a camera carried by the wing.

8. The aircraft of claim 1, wherein the aircraft comprises a tiltrotor aircraft.

9. The aircraft of claim 1, wherein at least a portion of the hoist system is disposed between spars of the wing.

10. The aircraft of claim 1, wherein at least a portion of the hoist system is supported by a spar of the wing.

11. The aircraft of claim 1, wherein the hoist system further comprises an actuator configured to selectively open a movable door carried by the wing.

12. A method of hoisting an item, comprising: providing the aircraft of claim 1; and
   extending a cable of the hoist system through an access hole of an exterior wall of the wing.

13. The method of claim 12, further comprising:
   passing the cable over a pulley within the wing.

14. The method of claim 12, further comprising:
   operating a camera carried by the wing to monitor a hoisting activity.

15. The method of claim 12, further comprising:
   supporting a motor of the hoist system with a spar of the wing.

16. The method of claim 12, further comprising:
   supporting a spool of the hoist system with a spar of the wing.

17. The method of claim 12, further comprising:
   supporting a pulley of the hoist system with a spar of the wing.

\* \* \* \* \*